(12) United States Patent
Wu et al.

(10) Patent No.: US 9,360,650 B2
(45) Date of Patent: Jun. 7, 2016

(54) LASER ALIGNMENT DEVICE WITH A MOVABLE MIRROR, LASER-TARGET ALIGNMENT SENSOR WITH MOVABLE MIRRORS AND LASER ALIGNMENT METHOD

(75) Inventors: Baolin Wu, Beijing (CN); Wensheng Zhang, Beijing (CN); Yali Shi, Beijing (CN); Yinxing Hao, Beijing (CN); Haipeng Li, Beijing (CN); Qiulei Dong, Beijing (CN); Haoxing Wang, Beijing (CN); Zhengtao Zhang, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 347 days.

(21) Appl. No.: 13/520,156

(22) PCT Filed: Apr. 28, 2011

(86) PCT No.: PCT/CN2011/073473
§ 371 (c)(1),
(2), (4) Date: Nov. 8, 2012

(87) PCT Pub. No.: WO2012/145913
PCT Pub. Date: Nov. 1, 2012

(65) Prior Publication Data
US 2013/0044195 A1    Feb. 21, 2013

(51) Int. Cl.
*G01B 11/14* (2006.01)
*H04N 7/18* (2006.01)
*G02B 7/00* (2006.01)
*G02B 26/08* (2006.01)

(52) U.S. Cl.
CPC ............ *G02B 7/005* (2013.01); *G02B 26/0816* (2013.01)

(58) Field of Classification Search
None
See application file for complete search history.

(56) References Cited

U.S. PATENT DOCUMENTS 3,528,744 A * 9/1970 Ware .............................. 356/450
3,764,512 A * 10/1973 Greenwood et al. .......... 204/645

(Continued)

FOREIGN PATENT DOCUMENTS

CN           100590381 C      2/2010

OTHER PUBLICATIONS

Lijun, B., et al., "ICF Laser Target Alignment Sensor Calibration System", Proc. of SPIE, vol. 6595, 2007, pp. 65951K-1-65951K-8.
Liu, B., et al., "Measurement and precision analysis on alignment of laser and target in ICF", Optics and Precision Engineering, vol. 17, No. 3, Mar. 2009, pp. 542-548.

(Continued)

*Primary Examiner* — Kate Luo
(74) *Attorney, Agent, or Firm* — Pillsbury Winthrop Shaw Pittman LLP (57) ABSTRACT

A laser alignment device with at least one movable mirror, a laser-target alignment sensor with movable mirrors and a laser alignment method are disclosed. The laser alignment device with the movable mirror comprises an image acquisition means for collecting incident lasers, a moveable mirror for reflecting the lasers to the image acquisition means and is operable to move linearly with respect to the image acquisition means, and a lens for forming an image of a target in the image acquisition means. The present disclosure achieves linear motion of the movable mirror with high accuracy in a small range, which in turn achieves fast and accurate alignment of the laser. It solves the problem of laser spots overlapping, reduces alignment time and improves shooting accuracy.

13 Claims, 8 Drawing Sheets

(56) References Cited

U.S. PATENT DOCUMENTS

2002/0108939 A1* 8/2002 Mayer ................ 219/121.79
2003/0184844 A1* 10/2003 Yazdi et al. ................ 359/298

OTHER PUBLICATIONS

International Search Report as issued for International Application No. PCT/CN2011/073473, dated Feb. 9, 2012.

* cited by examiner

LASER ALIGNMENT DEVICE WITH A MOVABLE MIRROR, LASER-TARGET ALIGNMENT SENSOR WITH MOVABLE MIRRORS AND LASER ALIGNMENT METHOD

CROSS-REFERENCE TO RELATED APPLICATION

This application claims the benefit of PCT Patent Application No. PCT/CN2011/073473, filed Apr. 28, 2011, in the State Intellectual Property Office of China, which is incorporated herein by reference in its entirety.

TECHNICAL FIELD

The disclosure relates to an alignment device for aligning a plurality of beams of laser, and in particular to a laser alignment device with a movable mirror, a laser-target alignment sensor with movable mirrors and a laser alignment method using the same.

BACKGROUND

The technique about accurate alignment of a plurality of beams of laser can be applied to the industrial field of sophisticated manufacture detection, and is also applicable to other specific fields in which a plurality of beams of laser are applied to be aligned to a tiny object. In these applications, a dedicated laser alignment device is used to guide several hundred of beams of laser to a target region within a range of several millimeters. Furthermore, the target is ablated by the several hundred of beams of laser. Normally, the process of aligning a plurality of beams of laser to a target is called a laser-target alignment process, and a dedicated sensor for aligning the plurality of beams of laser to the target in the laser alignment device to the target is called a laser-target alignment sensor.

Conventional laser-target alignment sensor works in a conjugate reflection condition to avoid distortion and scattering which otherwise are caused by direct radiation of laser beams. It solves the problem of aligning laser to the target to some extent, and improves accuracy of the laser-target alignment to some extent. However, when several hundred of laser beams are guided simultaneously to shoot the target, the laser-target alignment sensor has the problem that feedback spots are overlapped with each other and interferences with each other. Consequently, the laser-target alignment sensor cannot obtain accurate feedback of each incident laser beam. The problem may be solved by guiding a single laser beam each time to shoot the target, which, however, is very time-consuming. Besides, the originally-aligned laser beams may depart from the target over time, because the laser beams drift over time and physical and chemical characteristics of the system vary over time. To improve accuracy of alignment, one should take more time for adjustment. The more time for adjustment, the more serious an effect of the system drift on the accuracy is. Consequently, the compromise in the laser-target alignment is almost impossible.

That is, the conventional laser-target alignment sensor cannot achieve the compromise between accuracy and efficiency of adjustment in the laser-target alignment process.

Moreover, the conventional laser-target alignment sensor can only provide information about a position of a laser spot on a screen, but not information about a spatial location of the laser beam, such as a pitch angle of the incident laser beam. The conventional laser-target alignment sensor cannot be used to control spatial distribution of laser beams in a target chamber to optimize energy distribution of the laser beams in the target chamber.

SUMMARY OF THE DISCLOSURE

The present disclosure provides a laser alignment device with a movable mirror, a laser-target alignment sensor with movable mirrors comprising the laser alignment device. The laser alignment device is provided with movable mirrors system to achieve linear motion of the movable mirror with high accuracy in a small range, which in turn achieves fast and accurate alignment of the laser. It solves the problem of laser spots overlapping, reduces alignment time and improves shooting accuracy.

According to a first aspect of the present disclosure, there is provided a laser alignment device with a movable mirror, including: an image acquisition means for collecting incident laser to form an image; a mirror for reflecting laser from a plurality of laser sources to the image acquisition means; and a lens which is located between a target and the image acquisition means and used to form an image of the target in the image acquisition means; wherein the movable mirror is operable to move linearly with respect to the image acquisition means in a direction perpendicular to the image acquisition means.

Optionally, the movable mirror may be driven by a servo driving system.

Optionally, the servo driving system may include a servo motor and a transmission means which converts rotary motion of the servo motor to linear motion of the mirror.

Optionally, the servo driving system may include a manual appliance and a transmission means which converts rotary motion of the manual appliance to linear motion of the mirror.

Optionally, the servo driving system may drive the mirror to move linearly by one selected from a group consisting of magnetostriction means, piezoelectric ceramics means, linear motor, pneumatic means and hydraulic means.

Optionally, the transmission means may work based on one selected from a group consisting of a worm and gear system, a pair of bevel gears coupled with a ball screw, and a pair of wedge blocks.

Optionally, the movable mirror may be operable to move linearly by using a sliding means or a rolling means.

Optionally, the servo driving system further comprises a length gauge which detects a motion position of the movable mirror and provides a feedback signal for close-loop control of the movable mirror.

According to a second aspect of the present disclosure, there is provided a laser-target alignment sensor with movable mirrors, including: a first laser alignment device with a movable mirror according to the above laser alignment device; a second laser alignment device with a movable mirror according to the above laser alignment device, the first laser alignment device and the second laser alignment device being arranged symmetrically with respect to a target; a middle visual inspection means for focusing and forming an image of the target in a radial direction; and a differential focusing system for focusing and forming an image of the target in an axial direction.

Optionally, the differential focusing system may include a pair of lead screws having opposite thread directions and controls focusing in an axial direction in the first laser alignment device and the second laser alignment device for the target.

Optionally, the middle visual inspection means may include an image acquisition means and a lens.

According to a third aspect of the present disclosure, there is provided a laser alignment method using the laser alignment device according to the first aspect of the present disclosure, including: adjusting a position of a target so that the movable mirror is located at a conjugate position, and recording a position of an image of the target at the image acquisition means as a first point of the target; moving the movable mirror from the conjugate position to a first position towards the image acquisition means so that the laser forms an image at a second point at the image acquisition means; moving the movable mirror to a second position further towards the image acquisition means so that the laser forms an image at a third point at the image acquisition means; applying the laser obliquely at any angle α so that the laser forms an image at a fourth point at the image acquisition means; moving the movable mirror to a third position away from the image acquisition means so that the laser forms an image at a fifth point at the image acquisition means; determining a sixth point where the line segment between the fourth point and the fifth point crosses an extension line of the line segment between the second point and the third point; applying the laser obliquely at an angle varied by an angle β so that the laser forms an image at a seventh point in a line which crosses the first point and the sixth point; moving the movable mirror to the conjugate position away from the image acquisition means so that the laser forms an image at the eighth point at the image acquisition means; moving the movable mirror back to the third position towards the image acquisition means so that the laser forms an image again at the seventh point; determining a ninth point at the image acquisition means as a reference point so that the laser is aligned to the target when the laser forms an image at the ninth point at the image acquisition means; applying the laser obliquely at a varied angle so that an image point of the laser at the image acquisition means moves to the ninth point in a line which crosses the first point and the sixth point; and moving the movable mirror back to the conjugate position so that the image point of the laser at the image acquisition means returns to the first point of the target.

According to a fourth aspect of the present disclosure, there is provided a laser alignment method using the laser alignment device according to the second aspect of the present disclosure, including: adjusting a position of a target so that the movable mirror is located at a conjugate position, and recording a position of an image of the target at the image acquisition means as a first point of the target; moving the movable mirror from the conjugate position to a first position towards the image acquisition means so that the laser forms an image at a second point at the image acquisition means; moving the movable mirror to a second position further towards the image acquisition means so that the laser forms an image at a third point at the image acquisition means; applying the laser obliquely at any angle α so that the laser forms an image at a fourth point at the image acquisition means; moving the movable mirror to a third position away from the image acquisition means so that the laser forms an image at a fifth point at the image acquisition means; determining a sixth point where the line segment between the fourth point and the fifth point crosses an extension line of the line segment between the second point and the third point; applying the laser obliquely at an angle varied by an angle β so that the laser forms an image at a seventh point in a line which crosses the first point and the sixth point; moving the movable mirror to the conjugate position away from the image acquisition means so that the laser forms an image at the eighth point at the image acquisition means; moving the movable mirror back to the third position towards the image acquisition means so that the laser forms an image again at the seventh point; determining a ninth point at the image acquisition means as a reference point so that the laser is aligned to the target when the laser forms an image at the ninth point at the image acquisition means; applying the laser obliquely at a varied angle so that an image point of the laser at the image acquisition means moves to the ninth point in a line which crosses the first point and the sixth point; and moving the movable mirror back to the conjugate position so that the image point of the laser at the image acquisition means returns to the first point of the target.

According to a fifth aspect of the present disclosure, there is provided a laser alignment method including aligning a plurality of beams of laser by the laser alignment method according to the third or fourth aspect of the present disclosure.

As mentioned above, the laser alignment device with a movable mirror according to the present disclosure and the laser-target alignment sensor with movable mirrors including the same utilize movable mirrors system to solve the problem of overlapping a plurality of feedback images of the target, to reduce alignment time and to improve shooting accuracy. Thus, it improves an efficiency of a laser-target alignment process.

The present disclosure achieves accurate alignment of a plurality of beams of laser on a target, for example, in the inertia confinement fusion, to solve the problem of laser spots overlapping, to reduce alignment time and to improve shooting accuracy.

Furthermore, the present disclosure is directed to a rapid laser-target alignment process for the movable mirror on the basis of the structure of the above movable mirror system, which can rapidly and simultaneously align a plurality of beams of laser, save an adjustment time, and improve a shooting efficiency.

Other features and advantages of the present disclosure will become apparent from the following detailed description, the accompanying drawings, and the appended claims.

DETAILED DESCRIPTION

The disclosure will be further described in detail in the following embodiments in conjunction with the accompanying drawings, so that the object, solution and advantages according to the present disclosure are more apparent.

Figure 1:
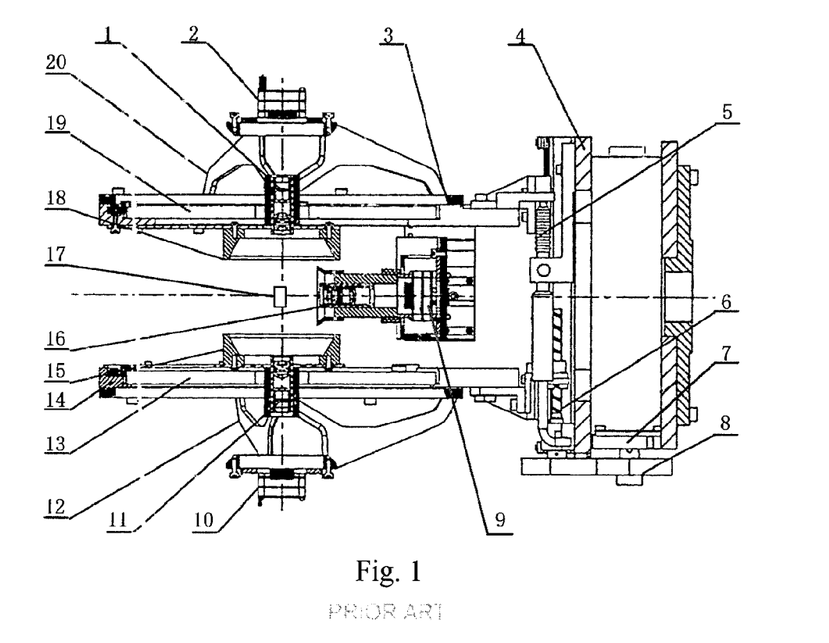
FIG. 1 schematically illustrates a structure of a laser-target alignment sensor according to the prior art.

FIG. 1 schematically illustrates a structure of a laser-target alignment sensor according to the prior art.

As shown in FIG. 1, the laser-target alignment sensor according to the prior art includes an upper laser alignment device, a central laser alignment device and a lower laser alignment device. The upper laser alignment device includes an upper CCD camera 2, an upper lens group 1, and an upper mirror 13. The lower part of the laser alignment device includes a lower CCD camera 10, a lower lens group 11 and a lower mirror 13. The central laser alignment device includes a central CCD camera 9 and a central lens group 16. The upper mirror 19 and the lower mirror 13 are fixed on an upper mirror fixture 3 and a lower mirror fixture 14, respectively. The upper CCD camera 2 is fixed on the upper mirror fixture 3 by an upper CCD camera support frame 20 and the lower CCD camera 10 is fixed on the lower mirror fixture 14 by a lower CCD camera support frame 12. It ensures that the relative distance between the CCD camera (referred as CCD hereinafter) and the mirror is constant in the upper and lower laser alignment devices.

The upper and lower laser alignment devices further include an upper light system 18 and a lower light system 15, which can provide light for forming an image of the target on the CCD.

In addition, the laser-target alignment sensor includes a driving system for driving the upper and the lower laser alignment device to perform differential motion. The driving system includes a position sensor 5, which provide a position feedback to ensure the position control precision. A sensor support table 4 is used for fixing the position sensor 5. A motor 8 provides the power for rotary motion. A transmission device 7 is coupled with the motor 8, which can transmit output rotary motion of the motor 8 to a lead screw actuator 6, and then converts the rotary motion to linear motion by the lead screw actuator 6. The lead screw actuator 6 is fixed on the upper mirror fixture 3, and the lower mirror fixture 14 is fixed on the sensor support table 4, in order to drive the upper laser alignment device, the lower laser alignment device and the position sensor 5 to move.

The motor 8 drives the lead screw actuator 6 to rotate via the transmission device 7, which in turn drives the upper and the lower laser alignment device to perform differential motion. The distances between upper and lower surfaces of the target 17 and reflecting surfaces of the upper and lower mirrors 19, 13 are equal to the distances between the upper and lower mirrors 19, 13 and the respective upper and lower CCD cameras 2, 10, respectively, so that optical conjugation can be established. Meanwhile, it must ensure that the upper and lower surfaces of the target 17 can form clear images on the respective image planes of the upper and lower CCD camera 2, 10.

It is clear that the distance between the mirror and CCD is constant in the laser-target alignment sensor according to the prior art. That is, the distance cannot be changed in the alignment process. Therefore, the laser-target alignment sensor according to the prior art is based on constant optical conjugation. The optical conjugation should be established exactly by a previous alignment process, and should be keep unchanged in operation to ensure that the optical conjugation is satisfied.

This type of laser-target alignment sensor has the following drawbacks.

For instance, for a single beam of laser, one can only acquire information about a laser spot as a "point" in a plane, but not information about a pitch angle of the laser beam. Consequently, only a position of the laser spot on an image plane of the CCD can be adjusted. The pitch angle of the laser beam cannot be controlled as required.

Meanwhile, for a plurality of beams of laser, a plurality of laser spots may be mixed near a target point, and one cannot distinguish which one of the plurality beams of laser each laser spot corresponds to.

Consequently, not only that accuracy of alignment is reduced, but also that alignment time is increased. The increased alignment time means that the stability of various positioning mechanisms and the laser source should be enhanced, which in turn increases cost among others. Some requirements can hardly be fulfilled in the current level of industry. With an increased alignment time, drifts from the various positioning mechanisms accumulate. As a result, alignment of a plurality of beams of laser becomes more difficult.

Therefore, it is necessary to take measures to realize rapid and precise alignment as soon as possible. To address the above problems, the present disclosure modifies the structure of the prior laser-target alignment sensor, and proposes the alignment method of aligning a plurality of beams of laser corresponding to the modified structure.

First Embodiment

The structure of a laser alignment device with a movable mirror according to the present disclosure and its principle will be described below.

Figure 2:
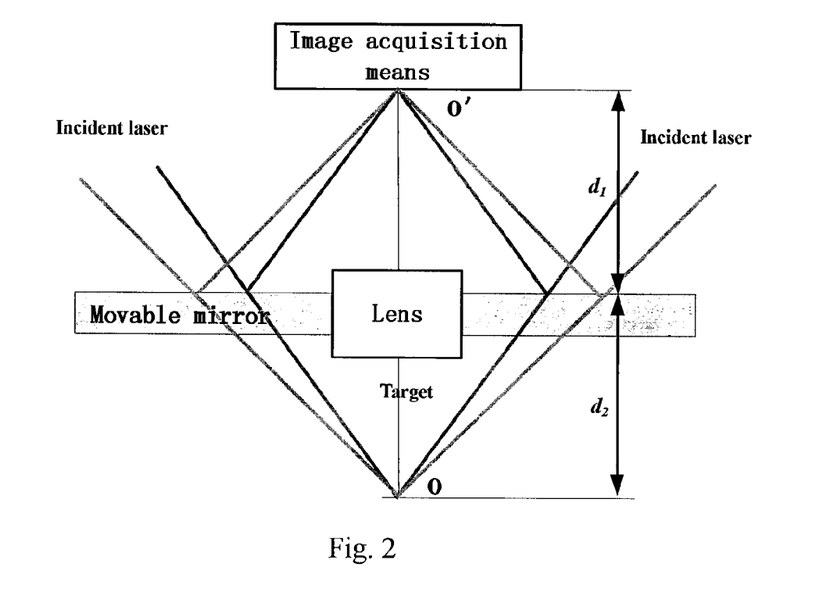
FIG. 2 schematically illustrates a structure of a laser alignment device with a movable mirror according to the first embodiment according to the present disclosure.

FIG. 2 schematically illustrates a structure of a laser alignment device with a movable mirror according to the first embodiment according to the present disclosure.

As shown in FIG. 2, the laser alignment device with a movable mirror comprises a target (O), a plurality of beams of laser emitted from a plurality of laser sources and illuminating the target, an image acquisition means for acquiring incident lights to form an image, a lens which is located between the target and the image acquisition means and is used to form an image of the target in the image acquisition means. It further includes movable mirrors between the target and the image acquisition means, for reflecting the plurality of beams of laser emitted from a plurality of laser sources onto the image acquisition means to form laser spots. The movable mirror can move linearly with respect to the image acquisition means in a direction perpendicular to the image acquisition means.

Note that the image acquisition means is preferably a CCD camera in accordance with embodiments herein, but not limited to this. Obviously, any device having the function of acquiring an image is applicable to the present disclosure.

In FIG. 2, the CCD camera is located at a focus of the lens and the target O is located at an working distance from the lens so that the target has an image formed on the CCD via the lens. A position of the target is adjusted so that a central axis of the target and an optical axis of the lens are coaxial, and the target is located at an working distance from the lens.

Furthermore, an initial position of the movable mirror in this embodiment is a conjugate position, namely the distance between the CCD camera and a reflecting surface of the mirror is equal to that between the target (O) and the reflecting surface of the mirror, d1=d2, i.e., one half of the distance between the target and the CCD camera. O' is an image of the target (O) on the CCD camera.

The principle of conjugation is: the point O and the point O' are symmetrical about the reflecting surface of the mirror; an incident laser beam at the point O is reflected to the point O' by the mirror; the distance between the reflected laser beam and the CCD camera is equal to that between the reflected laser beam and the target; the point O' and the point O are conjugate. In the practical application, when the mirror is located in a conjugate position, a reflected point of the incident laser beam can be controlled for a conjugate point of the incident laser beam, which avoids damages at the conjugate point of the target due to direct radiation of the laser beam and an effect of uncertain scattering distortion on alignment effect due to radiation of the laser beam on the target. In the present disclosure, the conjugate position means one half of the distance between a focused point of the laser at the same pitch angle and an image plane of the CCD.

As shown in FIG. 2, aligning the incident laser beam to the target is substantially equivalent to aligning the reflected laser spot to an image of the target in an image plane of the CCD camera. This method can substantially avoid exposing the target directly to the laser beam, which can otherwise preheats the target, and avoid the uncertain scattering distortion on the alignment effect due to radiation of the laser beam on the target. It facilitates aligning the laser beam to the target.

Second Embodiment

Figure 3:
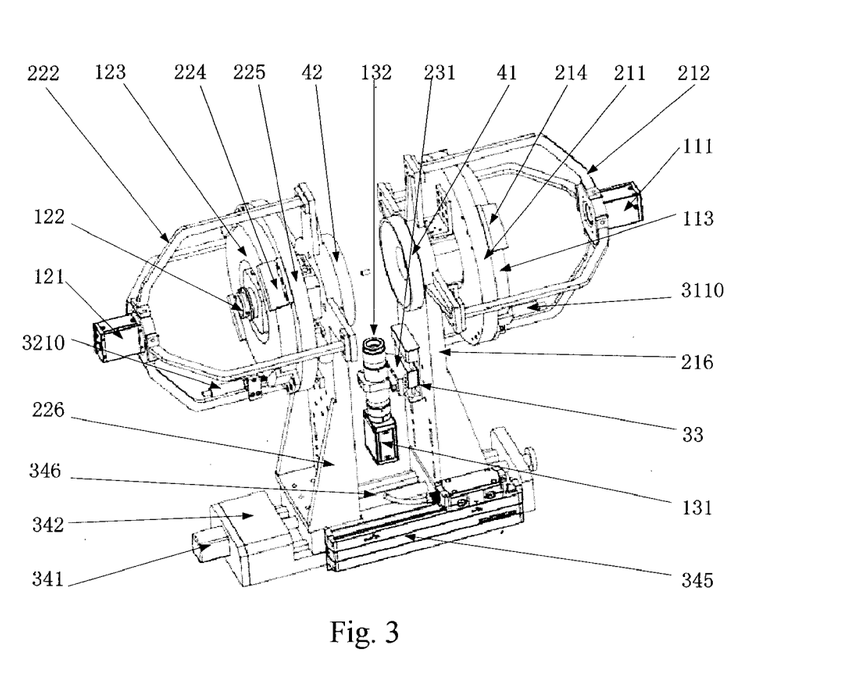
FIG. 3 schematically illustrates a three dimensional structure of a laser-target alignment sensor with movable mirrors according to the present disclosure.
Figure 4:
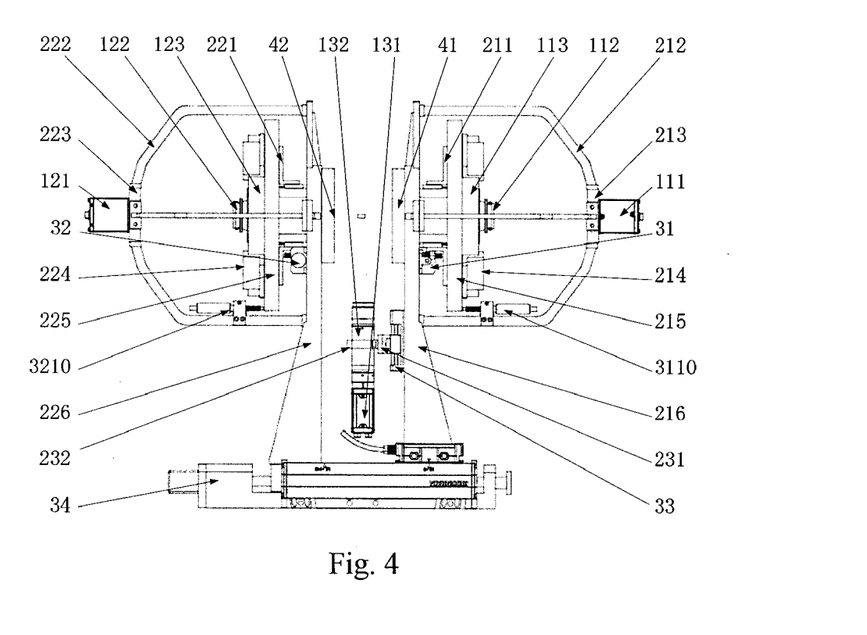
FIG. 4 is a front view showing a structure of a laser-target alignment sensor with movable mirrors according to the present disclosure.
Figure 5:
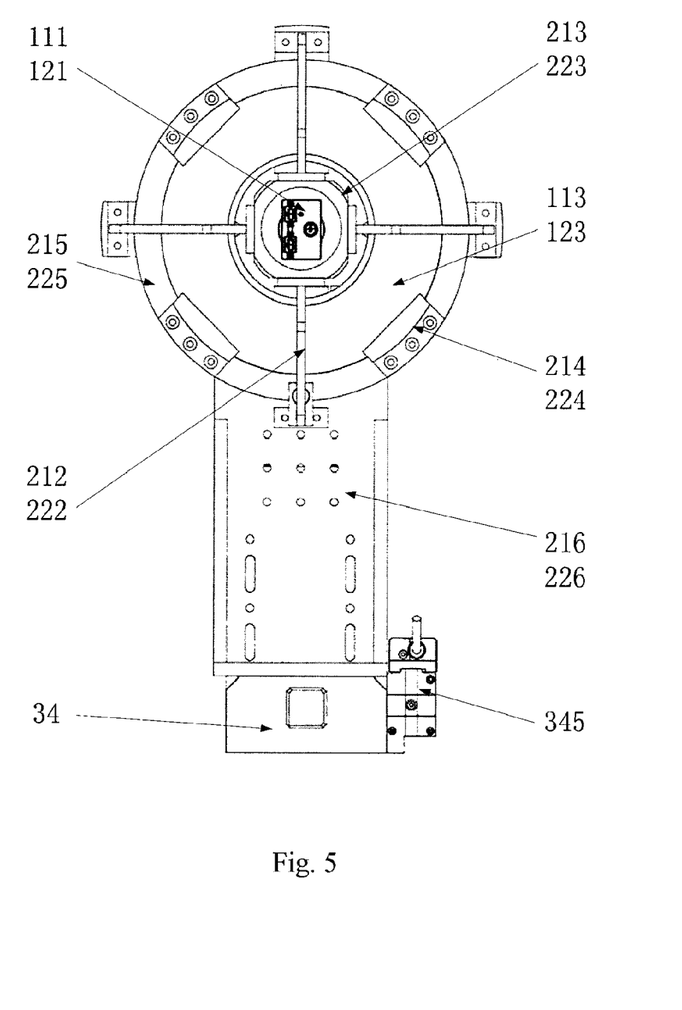
FIG. 5 is a left view showing a structure of a laser-target alignment sensor with movable mirrors according to the present disclosure.

The structure of a laser-target alignment sensor with movable mirrors according to the present disclosure will be described below. FIG. 3 schematically illustrates a three dimensional structure of a laser-target alignment sensor with movable mirrors according to the present disclosure. FIG. 4 is a front view showing a structure of a laser-target alignment sensor with movable mirrors according to the present disclosure. FIG. 5 is a left view showing a structure of a laser-target alignment sensor with movable mirrors according to the present disclosure.

As shown in FIGS. 3 to 5, the laser-target alignment sensor with the movable mirror according to the present disclosure comprises a first laser alignment device (on the left side in the figure), a second laser alignment device (on the right side in the figure), a middle visual inspection means, a differential focusing system, a servo driving system for the movable mirrors. The first laser alignment device and the second laser alignment device have the same structure, and are symmetrical about the target. All of the symmetrical components hereinafter are named by "left" and "right" to reflect the symmetrical relationship. The words "left" and "right" refer to the components of the first laser alignment device and the second laser alignment device, respectively.

(First and Second Laser Alignment Devices)

The first laser alignment device comprises a left lens 122, a left mirror 123, a left CCD camera 121. The second laser alignment device comprises a right lens 112, a right mirror 113, a right CCD camera 111. Herein, the left mirror and right mirror can both move linearly with respect to the CCD camera. The axis of all the components of the first and the second laser alignment device are coaxial, as an axis of the laser-target alignment sensor with the movable mirrors according to the present disclosure.

The left mirror 123 and the right mirror 113 are used to reflect the incident beams to image-sensitive planes of the respective CCD cameras. As shown in FIGS. 4 and 5, the right mirror 113 can be fixed on a right mirror moving base 215 by four right mirror fixtures 214. Similarly, a left mirror 123 can be fixed on a left mirror moving base 225 by four left mirror fixtures 224. It thus maintains a relative position between the mirrors and the mirror moving bases to be constant. In the embodiment according to the present disclosure, at least one of the mirrors is preferably an annular laser mirror, but is not limited to this. Any mirror which can reflect the laser beam is applicable to the present disclosure.

The left lens 122 and the right lens 112 are used to form images of the target on image planes of the respective CCD cameras. As shown in FIG. 4, the right lens 112 may be mounted in a lens opening of the right system fixing base 216, and the left lens 122 may be mounted in a lens opening of the left system fixing base 226. Thus, in the process of assembling and adjusting the system, the lens group can move forward and backward in the fixing bases 216, 226. Thus, the lens can perform translational motion relative to the CCD camera. A working distance of the lens group is adjusted by varying its position, which can ensure flexibility in assembling and adjusting the system.

The left CCD camera 121 and the right CCD camera 111 may acquire the laser beams reflected by the mirrors and form images of the target by using the lens.

The right CCD camera 111 is mounted on the right camera connector 213, which is coupled with the right system fixing base 216 by four right connection ribs 212. Left connection ribs 222, a left camera connector 223, a left system fixing base 226 and a left CCD camera 121 are mounted similarly in symmetrical manner. In this way, the camera connector is mounted on the fixing base 216 by the connection rib. The camera is then coupled with the cameral connector. Thus, the CCD camera can be fixed on the fixing base. The gap between the CCD camera and the connector is adjustable, which facilitates improving the system's applicability.

In addition, in the illustrated embodiment, there is an open space between the right camera 111 and the right lens 112, without lens pipes for connecting the camera and the lens. Laser beams reflected by the mirror and the target can form images simultaneously on the CCD camera without a hitch.

The left CCD camera 121 and the right CCD camera 111 are arranged symmetrically, and can have the same position, structure and function. Thus, details of the left CCD camera 121 are omitted here, but it should be understood that its details are substantially similar to those of the right CCD camera described above.

<Middle Visual Inspection System>

The middle visual inspection system comprises a middle CCD camera 131 and a middle lens 132. The middle visual inspection system may be fixed on a middle system fixing frame 231 via a middle camera fixing frame 232. The middle system fixing frame 231 can be coupled with a middle lens focus fine adjustment stage 33. Optionally, in an embodiment, the middle lens focus fine adjustment stage 33 is mounted on the right system fixing base 216 to constitute a middle lens focus adjustment system for auxiliary adjustment of the target's position and attitude and the lens' operating range, and for focusing and forming an image of the target in a radial direction (perpendicular to an axial direction of the laser-target alignment sensor with the movable mirror).

<Differential Focusing System>

The differential focusing system 34 controls the left and the right laser alignment devices mounted on the focus adjustment stage for focusing and forming an image of the target in an axial direction. By differential focusing the target, the system can ensure that a distance between the left lens and a left surface of the target is identical to a distance between the right lens and a right surface of the target and a high-definition image is formed.

Figure 6:
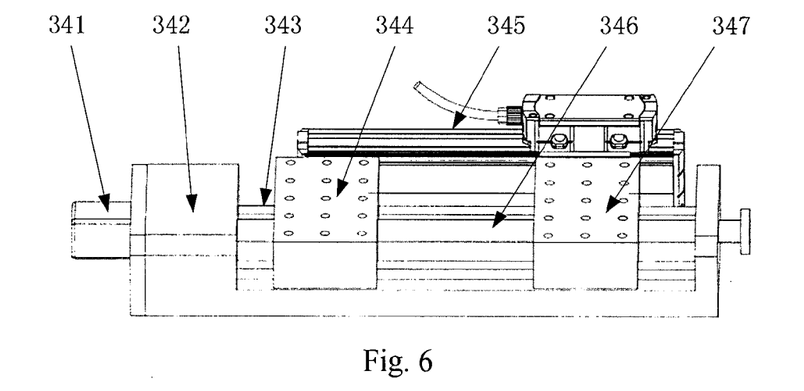
FIG. 6 schematically illustrates a structure of a differential focusing system comprising a laser-target alignment sensor with movable mirrors according to the present disclosure.

FIG. 6 schematically illustrates a structure of the differential focusing system of the laser-target alignment sensor with the movable mirrors according to the present disclosure.

As shown in FIG. 6, the differential focusing system 34 comprises a vacuum motor 341, a focusing system base 342, a slide rail 343, a left slider 344, a linear encoder 345, a differential screw 346, and a right slider 347. The left slider 344 is fixed on the fixing base 226 of the first laser alignment device, the right slider 347 is fixed on the fixing base 216 of the second laser alignment device. Herein, for example, the connection could be implemented by bolt connection or some other connection device. In addition, the left slider 344 and the right slider 347 are both mounted on and can slide on the slide rail 343. The left and right sliders are driven by a differential screw 346 with a right rotation direction, and can perform differential motion in the same and opposite directions. The left and the right laser alignment devices are further driven to focus and form an image of the target in the axial direction. It helps ensure that a high-definition image of the target is formed on the CCD camera.

<Servo Driving System for Movable Mirror>

The servo driving system for the movable mirror in the laser-target alignment sensor with at least one movable mirror according to the present disclosure will be described below.

In the laser-target alignment sensor with the movable mirror according to the present disclosure, the left and right mirror can move linearly with respect to the CCD camera by mounting servo driving system for a movable mirror between the mirror and a mounting base.

Figure 7:
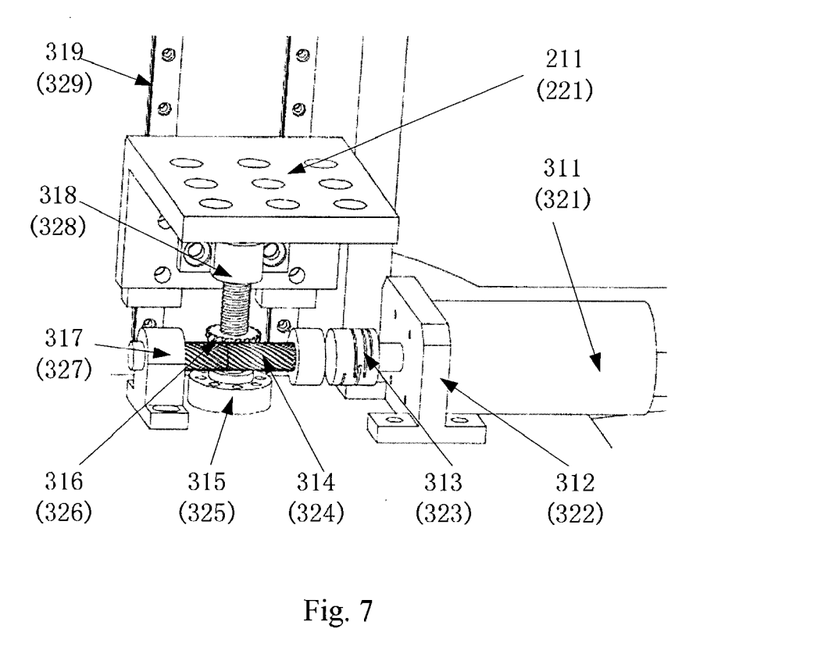
FIG. 7 schematically illustrates a structure of a servo driving system for movable mirrors according to the present disclosure.

FIG. 7 schematically illustrates a structure of an example of servo driving system for a movable mirror according to the present disclosure.

The servo driving system for the movable mirror comprises a left servo driving system and a right servo driving system, for driving the left mirror and the right mirror respectively. The left servo driving system and the right servo driving system are mounted symmetrically, and have the same structure and function. Hereinafter, for explanatory and simplicity purposes only, the right servo driving system's structure is described as an example.

In FIG. 7, reference numerals of various components are divided into two groups, one for the right servo driving system, the other (bracketed) for the left servo driving system. For example, 211 denotes a right L-shape connection plate, 221 in the brackets denotes a left L-shape connection plate, and so on.

As shown in FIG. 7, the right servo driving system comprises a right servo motor 311, a right motor mounting base 312, a right clutch 313, a right worm 314, a right screw bearing base 315, a right turbine screw base 316, a right worm bearing base 317, a right screw nut 318, a right slide rail kinematic pair 319, a right linear transducer 3110 (e.g., see FIG. 4). The right motor 311 is mounted on the right motor mounting base 312, connected by right clutch 313 and right worm 314. the right turbine screw base 316 transform level rotary motion into vertical rotary motion and reduce motor's velocity according to velocity ratio. The right turbine screw base 316 transform rotary motion into linear motion with right screw nut 318, two of them constitute transmission device of right servo driving system. The right L-shape connection plate 211 and right screw nut 318 are both connected with right slide rail kinematic pair 319, right screw nut 318 drive right L-shape connection plate 211 to perform linear motion along right slide rail kinematic pair 319. the with the ability of detecting position with high-precision, the right linear transducer 3110 detect the position of right clutch 313 as a feedback, thus accomplish high-precision close-loop control of mirror. The slide rail of right slide rail kinematic pair 319 is mounted on the guide post of the fixing base 216 of the second laser alignment device, the right L-shape connection plate 211 is connected with right mirror moving base 215. Consequently, the high-precision close-loop control of mirror's linear motion along the guide rail can be accomplished by the servo driving system.

As mentioned above, the present disclosure preferably implements the servo driving system as motor drive, namely a motor and a transmission device connected to it drive the mirror to perform linear motion along linear guide rail to accomplish high precision control of each mirror's position. But the present disclosure is not limited to this. Actually, any power-take-off device which can output power is applicable to the laser-target alignment sensor with the movable mirror according to the present disclosure.

For instance, by using manual appliance, a handle and a transmission device connected to it drive the mirror to perform linear motion along linear guide rail to accomplish high precision control of mirror's position. Moreover, magnetostriction, piezoelectric ceramics, linear motor, pneumatic manner, hydraulic pressure manner and other manners are also applicable here to accomplish high-precision close-loop control of mirror's linear motion.

In addition, a turbine and worm have self-locking function besides reversing and decelerating function, which help to avoid variation of mirror's position caused by external loading.

As mentioned above, the transmission and reversing device is not limited to the combination of worm and ball screw. Actually, any device with the ability of reversing is applicable to the present disclosure. For example, bevel gears coupled with ball screw or wedge block is applicable to the present disclosure as the transmission and reversing device.

The first laser alignment device and the second laser alignment device, with the same structure and operating principle, are mounted symmetrically to constitute the laser alignment device each with a movable mirror with high-precision detecting ability and position controlling ability. The first laser alignment device may comprise a left servo motor 321, a left motor mounting base 322, a left clutch 323, a left worm 324, a left screw bearing base 325, a left turbine screw 326, a left worm bearing base 327, a left screw nut 328, a left slide rail kinematic pair 329, a left linear transducer 3210 and so on. Similarly, by detecting a position of left mirror and providing feedback information, the high-precision close-loop control of mirror's linear motion can be accomplished by left linear transducer 3210.

In the present disclosure, according to an embodiment, the slide rail kinematic pair 319, 329, the fixing base 216, 226 and the L-shape connection plate 211, 221 may be connected by screws. The L-shape connection plate and the left and right mirror bases 215, 225 may be fixed by bolts. Thus, the mirror, which is mounted on the mirror base, can move along the rail relative to the CCD camera. The present disclosure is not limited to the linear motion provided by left and right slide rail kinematic pair 329, 319. For example, the mirror can be supported and guided to translate with the desired accuracy and speed, by using a rolling device (such as a rolling wheel, a rolling ball, or the like). The left and right length gauges can be a HEIDENHAIN length gauge, but is not limited to this.

Normal axes of the mirror, optical axes of the lens and normal lines of the CCDs in the left and right laser alignment derives can coincide with each other. Moreover, optical axes of the left and right laser alignment drives can coincide with each other. Moreover, a central line of the image plane of the middle CCD and an optical axis of the middle lens coincide with each other and are perpendicular to the optical axis of the left and right laser alignment devices. The optical axes of the left and right laser alignment devices and the optical axis of the middle laser alignment devices are coplanar.

The structure of the laser-target alignment sensor with the movable mirror is described above. In the alignment process, for example, the target, which is placed at the center of the sensor, can have three images formed in image planes of three CCDs via the left, middle and right laser alignment devices, respectively. Because of a small field depth, the focusing system is used for focusing to form sharp images of different targets. The left and right laser alignment devices are driven by a differential focusing system in an axial direction for the target and accomplish focusing by fine motion towards the target at a constant distance and a constant speed. The middle visual inspection system moves also at tiny steps together with the left and right laser alignment devices via the fine adjustment motion system, to control focusing in a radial direction for the target.

Moreover, a servo driving system for the movable mirror may be provided in addition to the left and right laser alignment devices. The servo driving system can drive the mirror to translate (e.g., via linear motion) in a normal line (i.e., the optical axis of the laser alignment device) of the mirror with respect to the CCD, to ensure fine adjustment in a small region. Therefore, the system can be used to realize fast alignment of the laser beam to the target, solve the problem of laser spots overlapping, reduces alignment time, and improve shooting accuracy.

Third Embodiment

The principle of a laser alignment device with a movable mirror according to the present disclosure will be described below.

<Working Mechanism of Movable Mirror>

Figure 8:
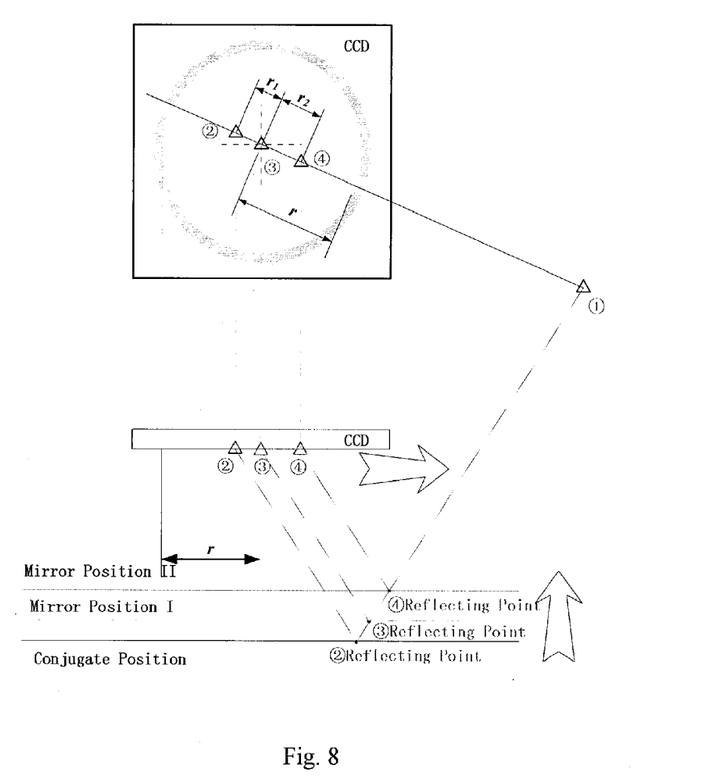
FIG. 8 schematically illustrates the relationship between motion of a mirror and trajectory of a reflected laser spot.

FIG. 8 illustrates an example of the relation between the motion of mirror and the trajectory of the laser spots.

As shown in FIG. 8, a laser beam is incident at the first point ①, reflected by the mirror, and reaches the CCD. The image at the CCD is shown in a plane view of the CCD. When the mirror moves towards the CCD in a vertical direction, an image point at the CCD will move in an arrow direction. Specifically, in accordance with an embodiment, when the mirror is located at the conjugate position, the laser beam is reflected at the second point ② at the mirror, and has a laser spot at the second point ② in an image plane of the CCD. When the mirror moves towards the CCD to the position I, the laser beam is reflected at the third point ③ at the mirror, and has a laser spot at the third point ③ in the image plane of the CCD; when the mirror further moves towards the CCD to the position II, the laser beam is reflected at the fourth point ④ at the mirror, and has a laser spot at the fourth point ④ in the image plane of the CCD.

<Laser Alignment Method Using Laser Alignment Device with Movable Mirror>

The laser alignment method using the movable mirror may include adjusting a pitch angle of a plurality beams of laser by using the laser alignment device according to the first embodiment of the present disclosure so that the plurality of beams of laser are focused on a prescribed point. Moreover, the laser-target alignment sensor according to the second embodiment of the present disclosure is provided on the basis of the laser alignment device according to the first embodiment of the resent disclosure. Many aspects of the laser alignment method in this embodiment is applicable to the laser-target alignment sensor.

Figure 9:
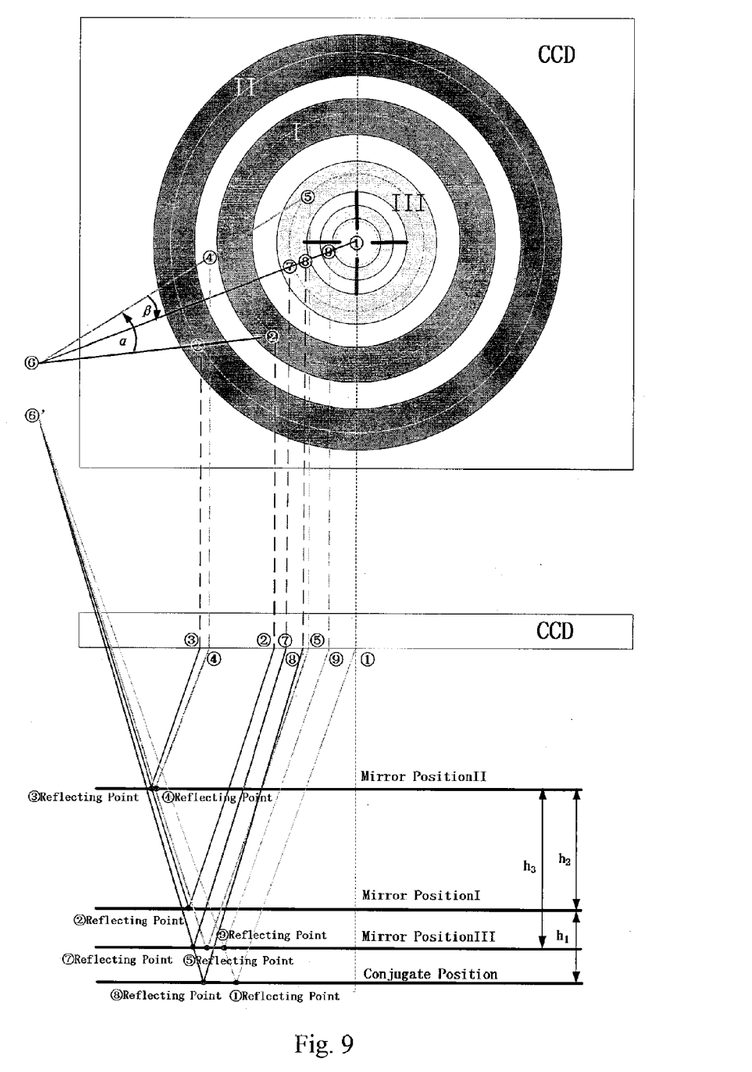
FIG. 9 schematically illustrates the principle of aligning a single beam of laser using a laser alignment device with a movable mirror according to the present disclosure.

FIG. 9 schematically illustrates the principle of aligning a single beam of laser using a laser alignment device with a movable mirror according to the present disclosure.

FIG. 9 explains how to form an image with a single beam of laser reflected to a CCD by a mirror. An upper plane view of the CCD shows distribution of laser spots at the CCD, which is an image formed by the laser.

The alignment method using a single beam of laser will be described below.

First, a position of the target is adjusted and the mirror is moved to a conjugate position. At the conjugate position, the target and the laser-target alignment sensor are coaxial, and the target, the movable mirror and the CCD satisfy the conjugate condition. Then, the position of the image of the target ①, at the CCD is recorded as a first point ①. The first point ① is a central point and indicates the desired position of the laser adjustment.

Next, the mirror moves towards the CCD to the position I at a distance h1. and the laser beam is reflected at the second point ② at the mirror, and has a laser spot at the second point ② at the CCD.

Then, the mirror moves towards the CCD to the position II at a distance h2, then laser beam is reflected at the third point ③ at the mirror, and has a laser spot at the third point ③ at the CCD. The, a normal plane of the mirror is determined, which is a plane perpendicular to the mirror surface and crosses the second ② and third ☐ points (similarly hereinafter).

Next, a laser source is adjusted to be oblique to emit a laser beam at a pitch angle α, then the laser beam is reflected at the fourth point ④ at the mirror and has a laser spot an image at the fourth point ④ at the CCD. The pitch angle of laser beam means an angle at which the laser beam rotates around a normal line (i.e. an optical axis) of the mirror. The motion that the laser beam emitted from a laser source rotates around the normal line of the mirror can be called "hover".

Next, the mirror moves away from the CCD at a distance h3 and return to the position III, where the laser beam is reflected at the fifth point ⑤ at the mirror, and has a laser spot at the fifth point ⑤ at the CCD. A normal plane of the mirror, which crosses the fourth ④ and fifth ⑤ points, can be determined.

Next, A cross point ⑥ at which extension lines of line segments ④⑤ and ②③ cross each other is determined, and then a normal plane of the mirror, which crosses the first ① and the sixth point ⑥, is also determined. In FIG. 9, the point ⑥' indicates an actual position of the laser source.

Next, the laser source hovers at a pitch angle β, so that the seventh point ⑦ is in a line which crosses the first and sixth points. Here, the laser beam is reflected at the seventh point ⑦ at the mirror.

At this point, a rotation axis, around which the laser source hovers, is a line which crosses the point ⑥' and is perpendicular to a plane of the mirror. A rotation angle around the rotation axis is called a pitch angle.

Next, the mirror moves back to the conjugate position away from the CCD, where the laser beam is reflected at the eighth point ⑧ at the mirror, and has a laser spot at the eighth point ⑧ at the CCD. As shown in FIG. 9, the eighth point ⑧ is also in the line which crosses the first and sixth points at the CCD.

Next, the mirror moves back to the position III towards the CCD. Here, the laser spot returns to the seventh point ⑦ at the CCD.

Next, a ninth point ⑨ is determined at the CCD as a reference point of the target so that the laser beam is exactly aligned to the target when the laser beam has a laser spot at the ninth point ⑨ at the CCD.

At shown in FIG. 9, the ninth point ⑨ as the reference point of the target is in a line which crosses the first point ①. The first point ① is in turn in an extension line of the line segment between the sixth point ⑥ and the ninth point ⑨. The ninth point ⑨ as the reference point of the target is such that the laser beam is exactly aligned to the position ①' of the target when the laser beam is reflected by the movable mirror and has a laser spot at the ninth point ⑨ at the CCD. That is, the position ①' of the target is exactly in an extension line between the laser source and the ninth point ⑨ at the mirror which corresponds to the ninth point ⑨ as the reference point of the target at the CCD.

Figure 10:
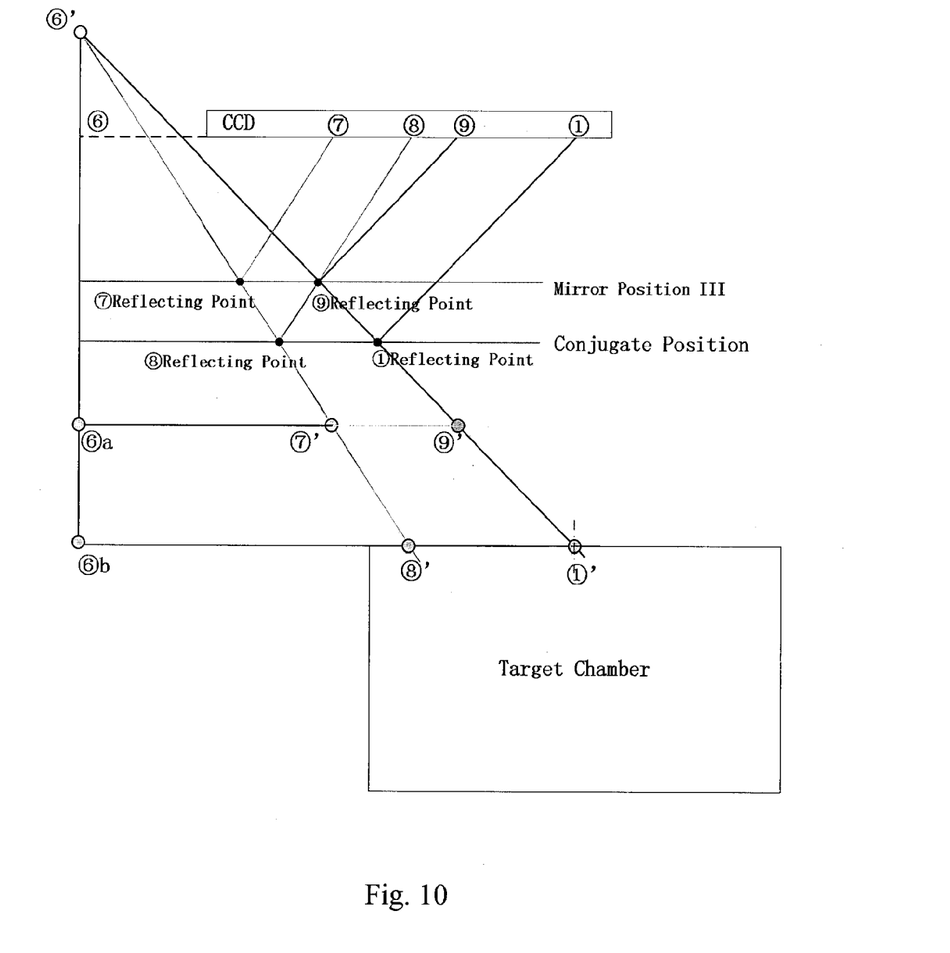
FIG. 10 schematically illustrates the principle of calculating a ninth point as a reference point of a target.

As shown in FIG. 10, the ninth point ⑨ as the reference point of the target is such that the laser beam is exactly reflected to the first point ① at the CCD, which indicates the desired position ①' of the target in a conjugation condition, when a pitch angle of the laser source is controlled so that the laser spot at the CCD moves to the ninth point ⑨ as the reference point of the target at the CCD along the line segment between the first point ① and the sixth point ⑥ and the mirror moves the conjugation position. By doing so, a central alignment is accomplished accurately.

The advantages of determining the ninth point ⑨ as the reference point of the target are that it avoids laser spots overlapping which otherwise occurs if a plurality of beams of laser are directly aligned to the desired position ①' of the target, and that it facilitates accurate alignment. The lager the distance between the ninth point ⑨ and the first point ① is, the smaller the possibility that laser spots of the plurality of beams of laser overlaps each other is.

In the present disclosure, a position of the ninth point ⑨ as the reference point of the target can be defined with a distance between the seventh point ⑦ at the CCD and the ninth point ⑨ at the CCD after the laser spot moves along the segment between the first point ① and the sixth point ⑥ at the CCD. The length ⑦⑨ of the line segment between the seventh point ⑦ and the ninth point ⑨ is calculated as follows.

FIG. 10 schematically illustrates the principle of calculating the ninth point ⑨ as the reference point of the target.

As shown in FIG. 10, because Δ⑥'⑦'⑨'~Δ⑥'⑧'①' (i.e. the triangle with vertices ⑥'⑦'⑨' is similar to the triangle with vertices ⑥'⑧'①'), the following equation is satisfied, $$\frac{\overline{⑦'⑨'}}{\overline{⑧'①'}} = \frac{\overline{⑥'⑦'}}{\overline{⑥'⑧'}}$$

Also, because Δ⑥'⑥a⑦'~Δ⑥'⑥b⑧', the following equation is satisfied, $$\frac{\overline{⑥a⑦'}}{\overline{⑥b⑧'}} = \frac{\overline{⑥'⑦'}}{\overline{⑥'⑧'}}$$

Also, because $\overline{⑥a⑦'}=\overline{⑥⑦}$, $\overline{⑥b⑧'}=\overline{⑥⑧}$, $\overline{⑦⑨}=\overline{⑦'⑨'}$, and $\overline{⑧①}=\overline{⑧'①'}$, the following equation is satisfied, $$\frac{\overline{⑦⑨}}{\overline{⑧①}} = \frac{\overline{⑥⑦}}{\overline{⑥⑧}} \Rightarrow \overline{⑦⑨} = \frac{\overline{⑥⑦} \times \overline{⑧①}}{\overline{⑥⑧}}.$$

In the above equations, the points ①', ⑦', ⑧', and ⑨' are conjugate points of the points ①, ⑦, ⑧, and ⑨ at the CCD with respect to the mirror at different positions, respectively. The point ⑥' is an actual optical point which corresponds to the point ⑥ and indicates a position of the laser source. The points ⑥a and ⑥b are cross points of a line that crosses the point ⑥' and is perpendicular to a plane of the CCD with a line between the points ⑦'⑨' and a line between the points ①'⑧', respectively. Lengths of the line segments ⑥⑦, ⑧① and ⑥⑧ can also be obtained by measurement, from which a length of the line segment ⑦⑨ can be calculated. Thus, the position of the ninth point ⑨ as the reference point of the target can be determined.

Next, a pitch angle of the laser source can be controlled so that a laser spot at the CCD moves to the ninth point ⑨ along the line segment between the points ①①, ⑥⑥. Here, a normal place that crosses the line segment between the points ①⑥ and is perpendicular to a plane of the CCD can be seen as a reference plane, a line that crosses the point ⑥' and is perpendicular to the reference plane can be seen as a rotation axis around which the laser source hovers, and a spatial angle between the laser beam and the rotation angle can be seen as a pitch angle of the laser source.

Next, the mirror moves back to the conjugate position so that the laser spot is reflected to the first point ① at the CCD. The alignment process is finished.

The laser alignment method is described above with a single beam of laser as an example. However, the above method is also applicable to alignment of a plurality of beams of laser in the same incident angle, or of a plurality of beams of laser in different incident angles, for example, being applied in different levels. The plurality of beams of laser can form image accurately at the central point ①.

Figure 11:
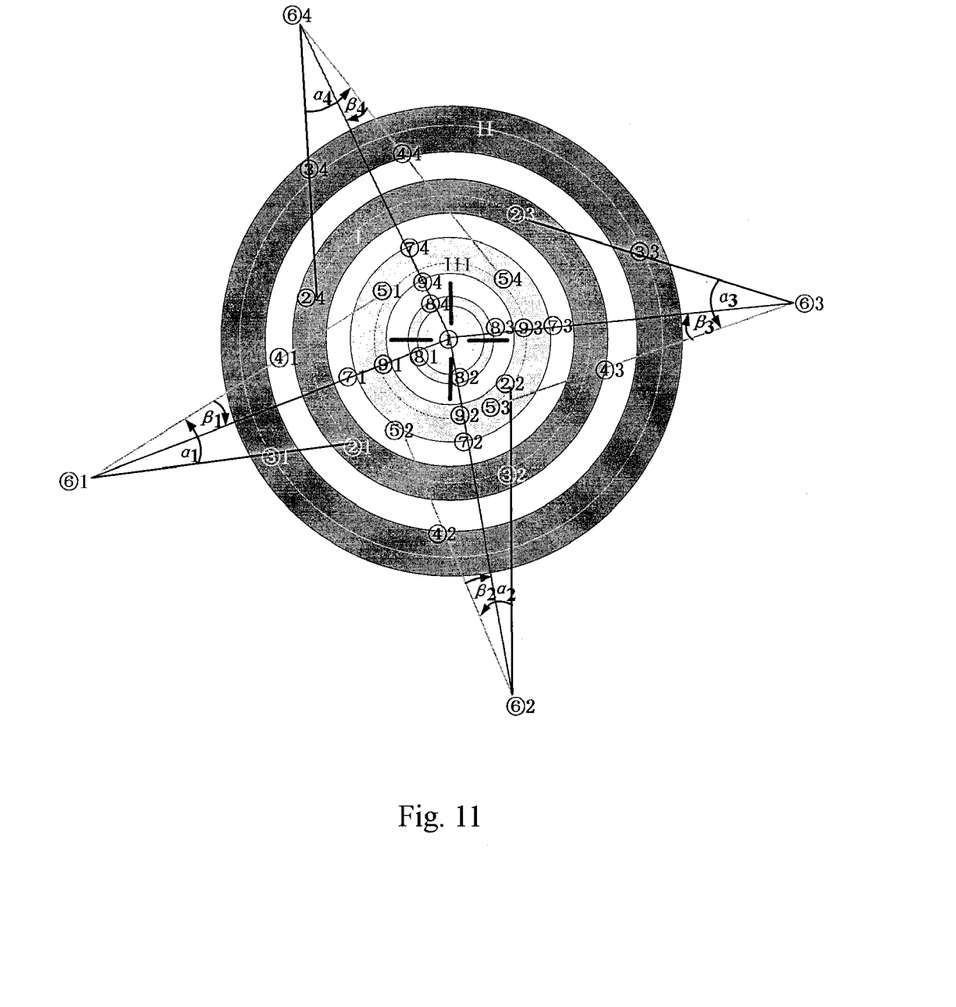
FIG. 11 schematically illustrates the principle of aligning a plurality of beams of laser.

FIG. 11 schematically illustrates the principle of aligning a plurality of beams of laser.

As show in FIG. 11, a plurality of beams of laser 1, 2, 3 and 4 are aligned with the above laser alignment for a single beam of laser. In the figure, the symbol ⓘj denotes the i-th point at the CCD of the j-th beam of laser. FIG. 11 shows an example in which four beams of laser are aligned simultaneously. Nevertheless, the present disclosure is not limited to this. Apparently, more beams of laser can be aligned simultaneously.

As mentioned above, the laser-target alignment sensor according to the present disclosure utilizes the above laser alignment method for rapidly and simultaneously aligning a plurality of beams of laser, which solves the problem of laser spots overlapping, saves an adjustment time, and improves a shooting efficiency.

The laser alignment device with at least one movable mirror and the laser-target alignment sensor comprising the same are described above, which comprises a movable mirror system. The laser alignment method for aligning a plurality of beams of laser is proposed on the basis of the movable mirror. In the present disclosure, a mirror in the sensor translates so that a position of a laser beam moves linearly at the mirror and a laser spot also moves linearly at the CCD, while a target image is not changed at the CCD. By doing so, a plurality of laser spots, which otherwise overlap each other, are separated from each other and provide accurate feedback. Moreover, an incident angle of the laser beam can be determined accurately by changing a position of a laser spot by a movable mirror.

It should be noted that the above-mentioned embodiments illustrate rather than limit the disclosure. Those skilled person in the art can make many modifications, equivalent changes and variations without departing from the spirit and scope of the present disclosure as set forth in the appended claims.

We claim:

1. A laser alignment device with a movable mirror, comprising:
   an image acquisition means for collecting incident laser to form an image;
   a moveable mirror for reflecting the laser to the image acquisition means and blocking the laser to be directly irradiated to a target; and
   a lens which is located between the target and the image acquisition means and used to form an image of the target in the image acquisition means,
   wherein the movable mirror is operable to move linearly with respect to the image acquisition means in a direction perpendicular to the image acquisition means, and
   wherein the movable mirror is driven in the perpendicular direction by a servo driving system for a plurality of times to different positions so that (a) a relative distance between the movable mirror and the image acquisition means is dynamically adjusted for different sections of the target and (b) an image is formed at the image acquisition means at each position, and wherein a pitch angle of the laser reflected onto the image acquisition means is adjusted for at least one position of the movable mirror to form an image at another point thereon to optimize energy distribution of the laser.

2. The laser alignment device according to claim 1, wherein the servo driving system comprises a servo motor and a transmission means which converts rotary motion of the servo motor to linear motion of the moveable mirror.

3. The laser alignment device according to claim 2, wherein the transmission means works based on one selected from a group consisting of: a worm and gear system, a pair of bevel gears coupled with a ball screw, and a pair of wedge blocks.

4. The laser alignment device according to claim 1, wherein the servo driving system comprises a manual appliance and a transmission means which converts rotary motion of the manual appliance to linear motion of the moveable mirror.

5. The laser alignment device according to claim 1, wherein the servo driving system drives the moveable mirror to move linearly by one selected from a group consisting of: magnetostriction means, piezoelectric ceramics means, linear motor, pneumatic means and hydraulic means.

6. The laser alignment device according to claim 1, wherein the movable mirror is operable to move linearly by using a sliding means or a rolling means.

7. The laser alignment device according to claim 1, wherein the servo driving system further comprises a length gauge which detects a motion position of the movable mirror and provides a feedback signal for close-loop control of the movable mirror.

8. A laser-target alignment sensor with movable mirrors, comprising:
   a first laser alignment device with a first movable mirror for reflecting a laser to a first visual inspection means for collecting incident laser to form an image, the first movable mirror being operable to move linearly with respect to the first visual inspection means in a direction perpendicular to the middle visual inspection means;
   a second laser alignment device with a second movable mirror for reflecting a laser to a second visual inspection means, the second movable mirror being operable to move linearly with respect to the second visual inspection means in a direction perpendicular to the middle visual inspection means;
   the first laser alignment device and the second laser alignment device being arranged symmetrically with respect to a target;
   a middle visual inspection means for focusing and forming an image of a target in a radial direction; and
   a differential focusing system for focusing and forming an image of the target in an axial direction,
   wherein the differential focusing system comprises a pair of lead screws having opposite thread directions and controls focusing in an axial direction in the first laser alignment device and the second laser alignment device for the target.

9. The laser-target alignment sensor according to claim 8, wherein the middle visual inspection means comprises an image acquisition means and a lens.

10. A method for laser alignment using a laser alignment device with a movable mirror comprising: an image acquisition means for collecting incident laser to form an image; a moveable mirror for reflecting the laser to the image acquisition means; and a lens which is located between a target and the image acquisition means and used to form an image of the target in the image acquisition means, the movable mirror being operable to move linearly with respect to the image acquisition means in a direction perpendicular to the image acquisition means; the method comprising:
   moving the movable mirror to a conjugate position, adjusting a position of a target, and recording a position of an image of the target at the image acquisition means as a first point of the target;
   moving the movable mirror from the conjugate position to a first position towards the image acquisition means so that the laser forms an image at a second point at the image acquisition means;
   moving the movable mirror to a second position further towards the image acquisition means so that the laser forms an image at a third point at the image acquisition means;
   applying the laser obliquely at any angle α so that the laser forms an image at a fourth point at the image acquisition means;
   moving the movable mirror to a third position away from the image acquisition means so that the laser forms an image at a fifth point at the image acquisition means;
   determining a sixth point where the line segment between the fourth point and the fifth point crosses an extension line of the line segment between the second point and the third point;
   applying the laser obliquely at an angle varied by an angle 1 so that the laser forms an image at a seventh point in a line which crosses the first point and the sixth point;
   moving the movable mirror to the conjugate position away from the image acquisition means so that the laser forms an image at the eighth point at the image acquisition means;
   moving the movable mirror back to the third position towards the image acquisition means so that the laser forms an image again at the seventh point;
   determining a ninth point at the image acquisition means as a reference point so that the laser is aligned to the target when the laser forms an image at the ninth point at the image acquisition means;
   applying the laser obliquely at a varied angle so that an image point of the laser at the image acquisition means moves to the ninth point in a line which crosses the first point and the sixth point; and moving the movable mirror back to the conjugate position so that the image point of the laser at the image acquisition means returns to the first point of the target.

11. The method for laser alignment according to claim 10, wherein a position of the ninth point as the reference point is calculated from $$\overline{⑦⑨} = \frac{\overline{③⑦} \times \overline{⑧①}}{\overline{⑥⑧}},$$

where $\overline{⑦⑨}$ represents a length of a line which crosses the seventh point and the ninth point.

12. A laser alignment method comprising aligning a plurality of beams of laser by the method for laser alignment according to claim 10.

13. A method for laser alignment using a laser-target alignment sensor at least one movable mirror for reflecting a laser to an image acquisition means for collecting incident laser to form an image, the at least one movable mirror being operable to move linearly with respect to the image acquisition means in a direction perpendicular to the image acquisition means; the method comprising:

moving the movable mirror to a conjugate position, adjusting a position of a target, and recording a position of an image of the target at the image acquisition means as a first point of the target;

moving the movable mirror from the conjugate position to a first position towards the image acquisition means so that the laser forms an image at a second point at the image acquisition means;

moving the movable mirror to a second position further towards the image acquisition means so that the laser forms an image at a third point at the image acquisition means;

applying the laser obliquely at any angle α so that the laser forms an image at a fourth point at the image acquisition means;

moving the movable mirror to a third position away from the image acquisition means so that the laser forms an image at a fifth point at the image acquisition means;

determining a sixth point where the line segment between the fourth point and the fifth point crosses an extension line of the line segment between the second point and the third point;

applying the laser obliquely at an angle varied by an angle β so that the laser forms an image at a seventh point in a line which crosses the first point and the sixth point;

moving the movable mirror to the conjugate position away from the image acquisition means so that the laser forms an image at the eighth point at the image acquisition means;

moving the movable mirror back to the third position towards the image acquisition means so that the laser forms an image again at the seventh point;

determining a ninth point at the image acquisition means as a reference point so that the laser is aligned to the target when the laser forms an image at the ninth point at the image acquisition means;

applying the laser obliquely at a varied angle so that an image point of the laser at the image acquisition means moves to the ninth point in a line which crosses the first point and the sixth point; and moving the movable mirror back to the conjugate position so that the image point of the laser at the image acquisition means returns to the first point of the target.

\* \* \* \* \*